Aug. 13, 1935.     W. M. SHEEHAN ET AL     2,011,017
RAILWAY VEHICLE TRUCK FRAME
Filed Oct. 19, 1931     2 Sheets-Sheet 1
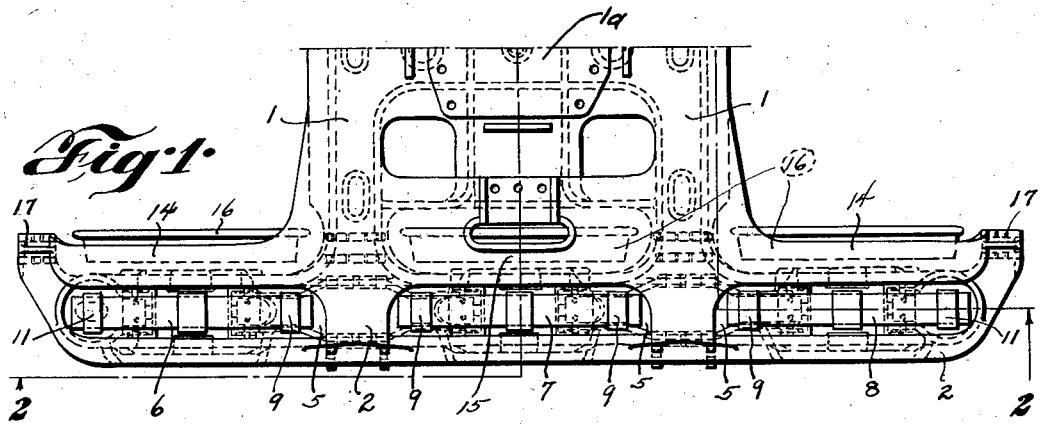
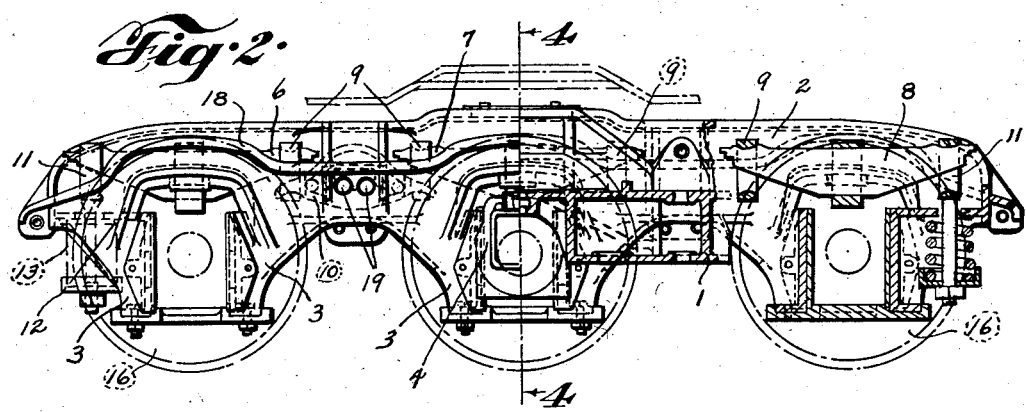
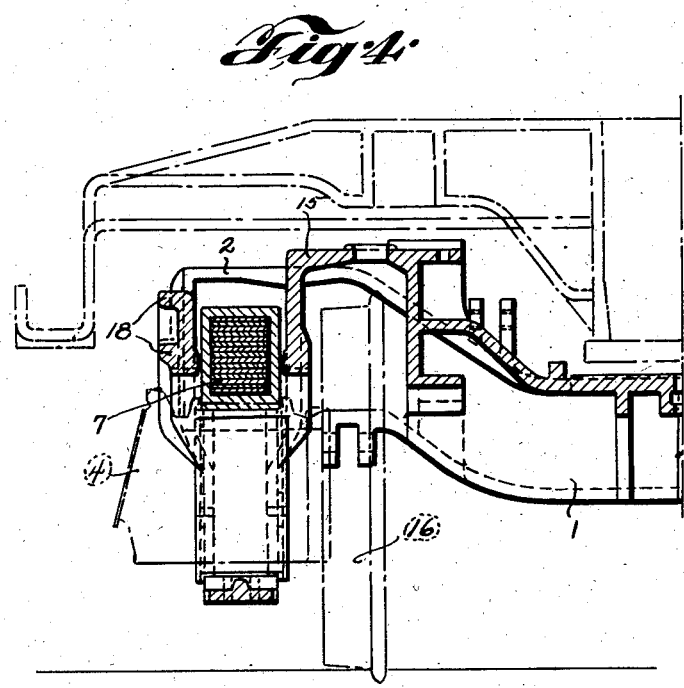
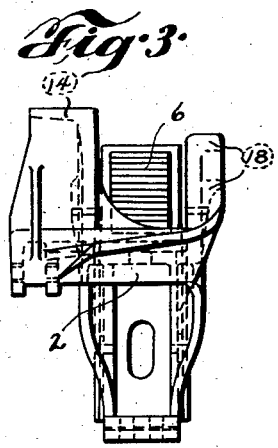
Inventors
Adelbert C. Wintemberg
William M. Sheehan
By Rodney Redell
Attorney Aug. 13, 1935.    W. M. SHEEHAN ET AL    2,011,017
RAILWAY VEHICLE TRUCK FRAME
Filed Oct. 19, 1931    2 Sheets-Sheet 2
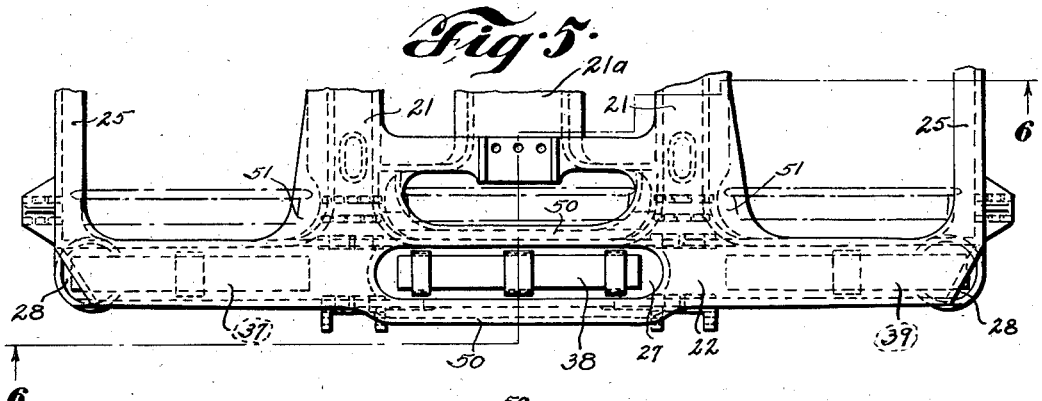
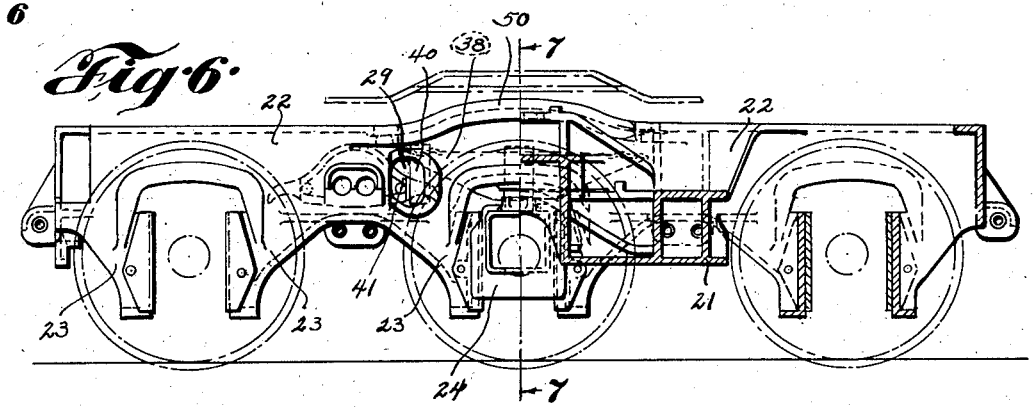
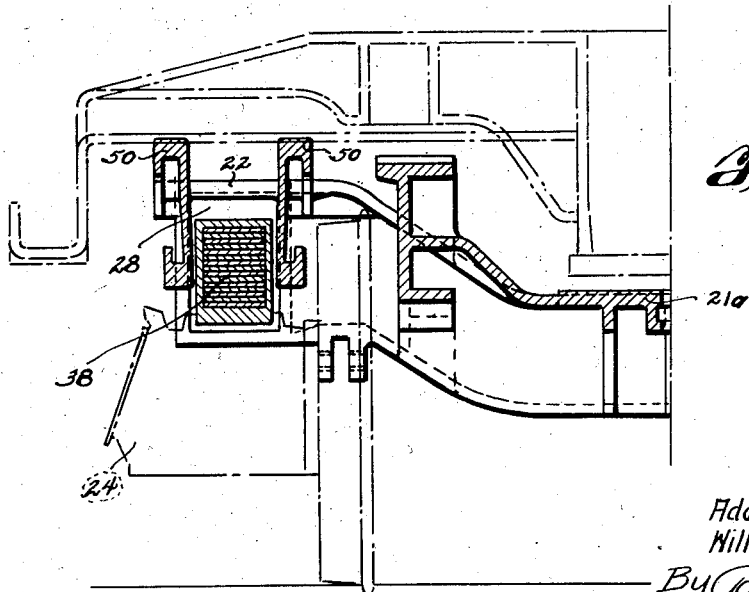
Inventors
Adelbert C. Wintemberg
William M. Sheehan
By Rodney Bedell
Attorney Patented Aug. 13, 1935

2,011,017

UNITED STATES PATENT OFFICE 2,011,017

RAILWAY VEHICLE TRUCK FRAME

William M. Sheehan, Merion, and Adelbert C. Wintemberg, Drexel Hill, Pa., assignors to General Steel Castings Corporation, Granite City, Ill., a corporation of Delaware Application October 19, 1931, Serial No. 569,718

3 Claims. (Cl. 105—195)

This invention relates to railway rolling stock and consists in a novel railway vehicle truck frame, particularly of the six wheel type.

The object of the invention is to provide a simple and inexpensive truck frame wherein a hollow wheel piece above the journal boxes is provided with spaced openings for providing access to the springs of the equalizing system and their suspension means contained in the wheel piece, or to permit the removal of any one of the springs without necessitating the removal of any of the other springs in case of a spring failure.

The invention consists in all the novel features hereinafter disclosed and illustrated in the accompanying drawings in which—

Figure 1 is a partial top view of a truck frame showing the preferred form of the invention embodied therein.

Figure 2 is a vertical longitudinal section and side view taken along the line 2—2 of Figure 1.

Figure 3 is an end view of one corner of the truck showing an end spring in position.

Figure 4 is a vertical transverse section taken along the line 4—4 of Figure 2.

Figure 5 is a partial top view of a truck frame and illustrates a modification of the invention.

Figure 6 is a vertical longitudinal section and side elevation taken along the line 6—6 of Figure 5.

Figure 7 is a vertical transverse section taken along the line 7—7 of Figure 6.

In the preferred form of the invention, a truck frame of the six wheel type is illustrated as having transoms 1 and bolster 1a and wheel pieces 2, having the usual pedestal jaws 3 for receiving associated journal boxes 4. That portion of the wheel piece 2 above the journal boxes is of hollow construction of varying depth, and longitudinal spaced openings 5 are provided in the upper face of said wheel piece.

A continuous equalizing system is contained in the hollow wheel piece and consists of a series of leaf springs 6, 7, and 8, mounted upon the journal boxes 4, and flexibly interconnected by means of shackles 9 and equalizers 10 pivoted on the walls of the wheel piece by spaced pins 19. Depending hangers 11, provided at the outer end of the springs 6 and 8, extend downwardly through the under side of the wheel piece and are provided with spring seats 12 and springs 13 for yieldingly anchoring the ends of the equalizing system to the truck frame.

The openings 5 are of generally rectangular contour and are so spaced longitudinally in the upper face of the wheel piece 2 as to be directly over the leaf springs 6, 7, and 8 and are of sufficient size to permit access to said springs and their suspension means, and in case of a spring failure, to permit the removal of any one of the springs, particularly the center one, from the truck frame without changing the position of or removing any of the other springs.

In trucks wherein this arrangement of springs is used for yieldingly supporting the truck frame, these openings in the wheel piece are of particular advantage in that the time and work required to remove one or more broken springs from the truck frame is obviously less than the time required in previous arrangements where others or all of the springs must be removed from the frame in order to replace any one of them.

Reinforcing flanges 14 and 15 extend inwardly from the top of the inner side wall of the wheel piece 2 and project over the truck wheels 16 and interconnect the wheel piece 2 and the transoms 1.

Reinforcing ribs 18 project outwardly from and near the top of the outer side wall of the wheel piece 2, and with the side wall form a substantially channel shaped section. These ribs 18 together with flanges 14 and 15 serve to strengthen the upper hollow section of the wheel piece around the openings therein, and the flanges 14 and 15 serve also to increase the rigidity of the frame.

Brake hanger brackets 17 are carried on the end continuations of the wheel piece 2 and are strengthened by the reinforcing flange 14.

In such a rigidly reinforced construction of a truck frame as described herein, the end transoms usually provided on the truck frame would be unnecessary and can, therefore, be eliminated.

In the modified form of the invention, shown in Figures 5 to 7, a truck frame comprises transoms 21 and bolster 21a, wheel pieces 22 having the usual pedestal jaws 23, associated journal boxes 24 and end transoms 25. That portion of the wheel piece 22 above the journal boxes is of hollow box construction of varying depth, and openings 27, 28, and 29 are provided in the upper face, ends and outer side respectively thereof.

It is intended to use the same form of a continuous equalizing system in the hollow portion of the wheel piece to yieldingly support the truck frame as described above in the preferred form of the invention.

The opening 27 is of generally rectangular contour and is directly over the center leaf spring 38, and is of sufficient size to permit access to the spring 38 and its suspension means, or the ready removal of said spring from the frame in case of breakage.

The openings 28 are of generally rectangular contour and of sufficient size to permit the removal of the end leaf springs 37 and 39 longitudinally from the truck frame.

The openings 29 in the outer side wall of the wheel piece are of generally circular contour, though not necessarily so, and are preferably in alignment with the inner ends of the equalizers 41. These openings are of sufficient size to permit the insertion of bars through the side wall for compressing the center spring 38 in order to remove the shackles 40, and thereby facilitate the removal of the spring from the frame. Additional side openings may be provided adjacent the outer ends of the equalizers to facilitate removal of end springs 37 and 39 through end openings 28.

It is apparent with the provision of these openings in the wheel piece that any one of the springs 37, 38, and 39, particularly spring 38, may be removed from the truck frame without necessitating the removal of either or both of the other springs from the frame.

Reinforcing flanges 50 are provided along the sides of the upper and central portion of the wheel piece and extend longitudinally thereon substantially the full length of the opening 27 to strengthen the wheel piece around the opening 27.

Reinforcing gusset members 51, between the transoms 21 and wheel piece 22, and end transoms 25 further increase the rigidity and strength of the truck frame.

While the truck frame may be either of the built up type or a one piece casting, the latter type has been illustrated, and is preferred because it is of more economical and rigid construction and eliminates the possibility of any parts becoming loose and wearing or becoming broken so as to necessitate replacement.

Obviously various features and details herein disclosed may be modified without departure from the spirit of the invention and the exclusive use of all features coming within the scope of the claims is contemplated.

What is claimed is:

1. In a truck rigid frame casting including a substantially centrally located transverse member, a wheel piece and an end transom, said wheel piece being, at least in part, of hollow, substantially box-shaped section of varying depth, spring equalizer members in said wheel piece, there being suitable openings located in the top, ends and one of the side walls of said wheel piece for facilitating insertion and removal of one of said members independently of the others thereof, there being reinforcing flanges projecting outwardly and downwardly from both sides of the wheel piece abreast of said top opening and extending longitudinally thereof to strengthen the wheel piece.

2. In a truck rigid frame, a wheel piece which is, at least in part, of hollow substantially box-shape cross section, spring equalizing members in said wheel piece, there being a suitable opening in the top wall of said wheel piece for facilitating insertion and removal of one of said members independently of the others, reinforcing flanges projecting outwardly and downwardly from the side of said wheel piece abreast of said opening and extending longitudinally thereof to strengthen the wheel piece by compensating for the reduced section resulting from said opening.

3. A railway truck frame having a box-shaped cross section substantially throughout its length and including spaced pairs of pedestal jaws for journal boxes, the side walls of the box-section of said wheel piece being provided with bearings for equalizer bar pivots and the top wall of the box section of said wheel piece being substantially continuous from side wall to side wall and throughout the portion overlying said bearings, said top wall having an elongated aperture disposed to permit the insertion into the wheel piece and the removal therefrom of equalizer supporting springs overlying the pedestal jaws, and the side walls of the box section of said wheel piece being reinforced adjacent to the apertured portion of the top wall to compensate for the reduced section of the top wall.

WILLIAM M. SHEEHAN.
ADELBERT C. WINTEMBERG.